US008694060B2

(12) United States Patent
Vanderaa et al.

(10) Patent No.: US 8,694,060 B2
(45) Date of Patent: Apr. 8, 2014

(54) FORM FACTOR AND ELECTROMAGNETIC INTERFERENCE PROTECTION FOR PROCESS DEVICE WIRELESS ADAPTERS

(75) Inventors: Joel D. Vanderaa, St. Paul, MN (US); Christina A. Grunig, Chanhassen, MN (US); Ronald F. Hurd, Marshalltown, IA (US); Brian L. Westfield, Victoria, MN (US); Chad M. McGuire, Shakopee, MN (US); Steven B. Paullus, Marshalltown, IA (US)

(73) Assignee: Rosemount Inc., Eden Prairie, MN (US)

( * ) Notice: Subject to any disclaimer, the term of this patent is extended or adjusted under 35 U.S.C. 154(b) by 440 days.

(21) Appl. No.: 12/485,189

(22) Filed: Jun. 16, 2009

(65) Prior Publication Data

US 2009/0311976 A1 Dec. 17, 2009

Related U.S. Application Data

(60) Provisional application No. 61/073,091, filed on Jun. 17, 2008, provisional application No. 61/073,098, filed on Jun. 17, 2008.

(51) Int. Cl.

| | |
|---|---|
| ***H04M 1/00*** | (2006.01) |
| ***H01Q 1/24*** | (2006.01) |
| ***H04B 1/16*** | (2006.01) |

(52) U.S. Cl.
USPC ......................... 455/572; 343/702; 455/343.1

(58) Field of Classification Search
USPC ........ 455/90.3, 90.1, 41.3, 575.3, 456.1, 550; 343/702, 700 MS, 767; 174/50.62
See application file for complete search history.

(56) References Cited

U.S. PATENT DOCUMENTS

| | | | | |
|---|---|---|---|---|
| 2,533,339 | A | 12/1950 | Willenborg | 177/311 |
| 2,640,667 | A | 6/1953 | Winn | 248/65 |
| 2,883,489 | A | 4/1959 | Eadie, Jr. et al. | 335/148 |
| 3,012,432 | A | 12/1961 | Moore d al. | 73/40 |

(Continued)

FOREIGN PATENT DOCUMENTS

| | | |
|---|---|---|
| CH | 672 368 A5 | 11/1989 |
| CN | 1251953 | 5/2000 |

(Continued)

OTHER PUBLICATIONS

International Search Report and Written Opinion for application No. PCT/US2009/003611, dated Nov. 4, 2009.

(Continued)

*Primary Examiner* — Andrew Wendell
*Assistant Examiner* — Cindy Trandai
(74) *Attorney, Agent, or Firm* — Westman, Champlin & Koehler, P.A.

(57) ABSTRACT

A process device wireless adapter includes a wireless communications module, a metallic housing, and an antenna. The wireless communications module is configured to communicatively couple to a process device and to a wireless receiver. The metallic housing surrounds the wireless communication module and has a first end and a second end. The first end is configured to attach to the process device. In one embodiment, a metallic shield contacts the housing second end such that the metallic shield and the housing form a substantially continuous conductive surface. The antenna is communicatively coupled to the wireless communication module and separated from the wireless communication module by the metallic shield. Preferably, the wireless communications module illustratively includes a printed circuit board that has a length that is greater than its width.

25 Claims, 8 Drawing Sheets

(56) References Cited

U.S. PATENT DOCUMENTS

| | | | | | |
|---|---|---|---|---|---|
| 3,218,863 | A | | 11/1965 | Calvert | 73/398 |
| 3,229,759 | A | | 1/1966 | Grover et al. | 165/105 |
| 3,232,712 | A | | 2/1966 | Stearns | 23/255 |
| 3,249,833 | A | | 5/1966 | Vosteen | 317/246 |
| 3,374,112 | A | | 3/1968 | Danon | 117/226 |
| 3,557,621 | A | | 1/1971 | Ferran | 73/398 |
| 3,568,762 | A | | 3/1971 | Harbaugh | 165/105 |
| 3,612,851 | A | | 10/1971 | Fowler | 362/30 |
| 3,631,264 | A | | 12/1971 | Morgan | 327/309 |
| 3,633,053 | A | | 1/1972 | Peters | 310/15 |
| 3,697,835 | A | | 10/1972 | Satori | 317/246 |
| D225,743 | S | | 1/1973 | Seltzer | D10/102 |
| 3,742,450 | A | | 6/1973 | Weller | 375/257 |
| 3,808,480 | A | | 4/1974 | Johnston | 317/256 |
| 3,881,962 | A | | 5/1975 | Rubinstein | 136/209 |
| 3,885,432 | A | | 5/1975 | Herzl | 73/861.22 |
| 3,924,219 | A | | 12/1975 | Braun | 338/34 |
| 3,931,532 | A | | 1/1976 | Byrd | 136/209 |
| 4,005,319 | A | | 1/1977 | Nilsson et al. | 310/8.3 |
| 4,008,619 | A | | 2/1977 | Alcaide et al. | 73/398 |
| 4,042,757 | A | | 8/1977 | Jones | 429/104 |
| 4,063,349 | A | | 12/1977 | Passler et al. | 29/627 |
| 4,084,155 | A | | 4/1978 | Herzl et al. | 340/870.39 |
| 4,116,060 | A | | 9/1978 | Frederick | 73/861.22 |
| 4,125,122 | A | | 11/1978 | Stachurski | 136/205 |
| 4,158,217 | A | | 6/1979 | Bell | 361/283 |
| 4,168,518 | A | | 9/1979 | Lee | 361/283 |
| 4,177,496 | A | | 12/1979 | Bell et al. | 361/283 |
| 4,227,419 | A | | 10/1980 | Park | 73/724 |
| 4,287,553 | A | | 9/1981 | Braunlich | 361/283 |
| 4,295,179 | A | | 10/1981 | Read | 361/600 |
| 4,322,724 | A | | 3/1982 | Grudzinski | 340/595 |
| 4,322,775 | A | | 3/1982 | Delatorre | 361/283 |
| 4,336,567 | A | | 6/1982 | Anastasia | 361/283 |
| 4,358,814 | A | | 11/1982 | Lee et al. | 361/283 |
| 4,361,045 | A | | 11/1982 | Iwasaki | 73/654 |
| 4,370,890 | A | | 2/1983 | Frick | 73/718 |
| 4,383,801 | A | | 5/1983 | Pryor | 416/17 |
| 4,389,895 | A | | 6/1983 | Rud, Jr. | 73/724 |
| 4,390,321 | A | | 6/1983 | Langlois et al. | 417/15 |
| 4,422,125 | A | | 12/1983 | Antonazzi et al. | 361/283 |
| 4,422,335 | A | | 12/1983 | Ohnesorge et al. | 73/724 |
| 4,434,451 | A | | 2/1984 | Delatorre | 361/283 |
| 4,455,874 | A | | 6/1984 | Paros | 73/704 |
| 4,458,537 | A | | 7/1984 | Bell et al. | 73/718 |
| 4,475,047 | A | | 10/1984 | Ebert | 307/66 |
| 4,476,853 | A | | 10/1984 | Arbogast | 126/578 |
| 4,485,670 | A | | 12/1984 | Camarda et al. | 73/179 |
| 4,490,773 | A | | 12/1984 | Moffatt | 361/283 |
| 4,510,400 | A | | 4/1985 | Kiteley | 307/66 |
| 4,542,436 | A | | 9/1985 | Carusillo | 361/283 |
| 4,562,742 | A | | 1/1986 | Bell | 73/718 |
| 4,570,217 | A | | 2/1986 | Allen et al. | 700/19 |
| 4,590,466 | A | | 5/1986 | Wiklund et al. | 340/870.28 |
| 4,639,542 | A | | 1/1987 | Bass et al. | 136/210 |
| 4,670,733 | A | | 6/1987 | Bell | 338/36 |
| 4,701,938 | A | | 10/1987 | Bell | 375/257 |
| 4,704,607 | A | | 11/1987 | Teather et al. | 340/825.07 |
| 4,749,993 | A | | 6/1988 | Szabo et al. | 340/870.31 |
| 4,785,669 | A | | 11/1988 | Benson et al. | 73/718 |
| 4,860,232 | A | | 8/1989 | Lee et al. | 364/571.04 |
| 4,875,369 | A | | 10/1989 | Delatorre | 73/151 |
| 4,878,012 | A | | 10/1989 | Schulte et al. | 324/60 |
| 4,926,674 | A | | 5/1990 | Fossum et al. | 73/4 |
| 4,951,174 | A | | 8/1990 | Grantham et al. | 361/283.1 |
| 4,977,480 | A | | 12/1990 | Nishihara | 73/724 |
| 4,982,412 | A | | 1/1991 | Gross | 377/6 |
| 5,009,311 | A | | 4/1991 | Schenk | 206/332 |
| 5,014,176 | A | | 5/1991 | Kelleher et al. | 363/26 |
| 5,023,746 | A | | 6/1991 | Epstein | 361/56 |
| 5,025,202 | A | | 6/1991 | Ishii et al. | 220/101 |
| 5,060,295 | A | | 10/1991 | Borras et al. | 455/186 |
| 5,079,562 | A | | 1/1992 | Yarsunas et al. | 343/792 |
| 5,094,109 | A | | 3/1992 | Dean et al. | 73/718 |
| D331,370 | S | | 12/1992 | Williams | D10/46 |
| 5,168,419 | A | | 12/1992 | Delatorre | 361/283 |
| 5,170,671 | A | | 12/1992 | Miau et al. | 73/861.22 |
| 5,194,819 | A | | 3/1993 | Briefer | 73/718 |
| 5,223,763 | A | | 6/1993 | Chang | 310/339 |
| 5,230,250 | A | | 7/1993 | Delatorre | 73/733 |
| 5,233,875 | A | | 8/1993 | Obermeier et al. | 73/718 |
| D345,107 | S | | 3/1994 | Williams | D10/46 |
| 5,313,831 | A | | 5/1994 | Beckman | 73/204.24 |
| 5,329,818 | A | | 7/1994 | Frick et al. | 73/708 |
| 5,412,535 | A | | 5/1995 | Chao et al. | 361/700 |
| 5,492,016 | A | | 2/1996 | Pinto et al. | 73/724 |
| 5,495,769 | A | | 3/1996 | Broden et al. | 73/18 |
| 5,506,757 | A | | 4/1996 | Brorby | 361/796 |
| 5,531,936 | A | | 7/1996 | Kanatzidis et al. | 252/587 |
| 5,542,300 | A | | 8/1996 | Lee | 73/724 |
| 5,554,809 | A | | 9/1996 | Tobita et al. | 73/700 |
| 5,554,922 | A | | 9/1996 | Kunkel | 322/3 |
| 5,599,172 | A | | 2/1997 | McCabe | 417/334 |
| 5,606,513 | A | | 2/1997 | Louwagie et al. | 702/138 |
| 5,610,552 | A | | 3/1997 | Schlesinger et al. | 327/560 |
| 5,614,128 | A | | 3/1997 | Kanatzidis et al. | 252/582 |
| 5,618,471 | A | | 4/1997 | Kanatzidis et al. | 252/582 |
| 5,637,802 | A | | 6/1997 | Frick et al. | 73/724 |
| 5,642,301 | A | | 6/1997 | Warrior et al. | 364/571.02 |
| 5,644,185 | A | | 7/1997 | Miller | 310/306 |
| 5,656,782 | A | | 8/1997 | Powell, II et al. | 73/756 |
| 5,665,899 | A | | 9/1997 | Willcox | 731/1.63 |
| 5,682,476 | A | | 10/1997 | Tapperson et al. | 395/200.05 |
| 5,705,978 | A | | 1/1998 | Frick et al. | 340/511 |
| 5,722,249 | A | | 3/1998 | Miller, Jr. | 62/238.2 |
| 5,726,846 | A | | 3/1998 | Houbre | 361/93 |
| 5,757,608 | A | | 5/1998 | Bernot et al. | |
| 5,764,891 | A | * | 6/1998 | Warrior | 710/72 |
| 5,787,120 | A | | 7/1998 | Louagie et al. | 375/257 |
| 5,793,963 | A | | 8/1998 | Tapperson et al. | 395/200.31 |
| 5,803,604 | A | | 9/1998 | Pompei | 374/181 |
| 5,811,201 | A | | 9/1998 | Skowronski | 429/17 |
| 5,851,083 | A | | 12/1998 | Palan | 403/337 |
| 5,870,695 | A | | 2/1999 | Brown et al. | 702/138 |
| 5,872,494 | A | | 2/1999 | Palan et al. | 333/252 |
| 5,899,962 | A | | 5/1999 | Louwagie et al. | 702/138 |
| 5,911,162 | A | | 6/1999 | Denner | 73/718 |
| 5,929,372 | A | | 7/1999 | Oudoire et al. | 136/208 |
| 5,954,526 | A | | 9/1999 | Smith | 439/136 |
| 5,957,727 | A | * | 9/1999 | Page, Jr. | 439/607.58 |
| 5,978,658 | A | | 11/1999 | Shoji | 455/66 |
| 5,992,240 | A | | 11/1999 | Tsuruoka et al. | 73/718 |
| 6,013,204 | A | | 1/2000 | Kanatzidis et al. | 252/584 |
| 6,038,927 | A | | 3/2000 | Karas | 73/706 |
| 6,079,276 | A | | 6/2000 | Frick et al. | 73/18 |
| 6,104,759 | A | | 8/2000 | Carkner et al. | 375/295 |
| 6,109,979 | A | | 8/2000 | Garnett | 439/709 |
| 6,126,327 | A | | 10/2000 | Bi et al. | 709/221 |
| 6,127,739 | A | | 10/2000 | Appa | 290/55 |
| 6,150,798 | A | | 11/2000 | Ferry et al. | 323/273 |
| D439,177 | S | | 3/2001 | Fandrey et al. | D10/46 |
| D439,178 | S | | 3/2001 | Fandrey et al. | D10/46 |
| D439,179 | S | | 3/2001 | Fandrey et al. | D10/46 |
| D439,180 | S | | 3/2001 | Fandrey et al. | D10/85 |
| D439,181 | S | | 3/2001 | Fandrey et al. | D10/46 |
| D441,672 | S | | 5/2001 | Fandrey et al. | D10/52 |
| 6,236,096 | B1 | | 5/2001 | Chang et al. | 257/419 |
| 6,236,334 | B1 | | 5/2001 | Tapperson et al. | 340/825 |
| 6,255,010 | B1 | | 7/2001 | George et al. | 429/30 |
| 6,282,247 | B1 | | 8/2001 | Shen | 375/285 |
| 6,295,875 | B1 | | 10/2001 | Frick et al. | 73/718 |
| 6,312,617 | B1 | | 11/2001 | Kanatzidis et al. | 252/62.3 |
| 6,326,764 | B1 | | 12/2001 | Virtudes | 320/101 |
| 6,338,283 | B1 | | 1/2002 | Navarro | 73/865.8 |
| 6,360,277 | B1 | | 3/2002 | Ruckley et al. | 709/250 |
| 6,385,972 | B1 | | 5/2002 | Fellows | 60/517 |
| 6,405,139 | B1 | | 6/2002 | Kicinski et al. | 702/33 |
| 6,429,786 | B1 | | 8/2002 | Bansemir et al. | 340/870.27 |
| 6,441,747 | B1 | | 8/2002 | Khair et al. | 340/870.16 |
| 6,457,367 | B1 | | 10/2002 | Behm et al. | 73/753 |
| 6,480,699 | B1 | | 11/2002 | Lovoi | 455/41.2 |
| 6,484,107 | B1 | | 11/2002 | Roper et al. | 702/50 |
| 6,487,912 | B1 | | 12/2002 | Behm et al. | 73/753 |
| 6,504,489 | B1 | | 1/2003 | Westfield et al. | 340/870.3 |

(56) References Cited

U.S. PATENT DOCUMENTS

| | | | | |
|---|---|---|---|---|
| 6,508,131 | B2 | 1/2003 | Frick | 73/756 |
| 6,510,740 | B1 | 1/2003 | Behm et al. | 73/708 |
| 6,511,337 | B1 | 1/2003 | Fandrey et al. | 439/320 |
| D471,829 | S | 3/2003 | Dennis et al. | D10/85 |
| D472,831 | S | 4/2003 | Dennis et al. | D10/85 |
| 6,546,805 | B2 | 4/2003 | Fandrey et al. | 73/753 |
| 6,553,076 | B1 | 4/2003 | Huang | 375/257 |
| 6,568,279 | B2 | 5/2003 | Behm et al. | 73/753 |
| 6,571,132 | B1 | 5/2003 | Davis et al. | 700/2 |
| 6,574,515 | B1 | 6/2003 | Kirkpatrick et al. | 700/19 |
| 6,593,857 | B1 | 7/2003 | Roper et al. | 340/870.3 |
| 6,609,427 | B1 | 8/2003 | Schnaare et al. | 73/753 |
| 6,640,308 | B1 | 10/2003 | Keyghobad et al. | 713/300 |
| 6,661,220 | B1 | 12/2003 | Glehr | 324/207.17 |
| 6,662,662 | B1 | 12/2003 | Nord et al. | 73/715 |
| 6,667,594 | B2 | 12/2003 | Chian | 318/696 |
| 6,680,690 | B1 | 1/2004 | Nilsson et al. | 342/124 |
| 6,690,182 | B2 | 2/2004 | Kelly et al. | 324/700 |
| 6,711,446 | B2 | 3/2004 | Kirkpatrick et al. | 700/19 |
| 6,747,573 | B1 | 6/2004 | Gerlach et al. | 340/870.21 |
| 6,765,968 | B1 | 7/2004 | Nelson et al. | 375/257 |
| 6,774,814 | B2 | 8/2004 | Hilleary | 340/870.07 |
| 6,778,100 | B2 | 8/2004 | Schempf | 340/870.07 |
| 6,792,259 | B1 | 9/2004 | Parise | 455/343.1 |
| 6,823,072 | B1 | 11/2004 | Hoover | 381/7 |
| 6,838,859 | B2 | 1/2005 | Shah | 322/38 |
| 6,839,546 | B2 | 1/2005 | Hedtke | 455/67.11 |
| 6,839,790 | B2 | 1/2005 | Barros De Almeida et al. | 710/305 |
| 6,843,110 | B2 | 1/2005 | Deane et al. | 73/114.35 |
| 6,891,477 | B2 | 5/2005 | Aronstam | 340/606 |
| 6,891,838 | B1 | 5/2005 | Petite et al. | 370/401 |
| 6,898,980 | B2 | 5/2005 | Behm et al. | 73/756 |
| 6,904,295 | B2 | 6/2005 | Yang | 455/522 |
| 6,907,383 | B2 | 6/2005 | Eryurek et al. | 702/183 |
| 6,910,332 | B2 | 6/2005 | Fellows | 60/520 |
| 6,942,728 | B2 | 9/2005 | Caillat et al. | 117/3 |
| 6,984,899 | B1 | 1/2006 | Rice | 290/44 |
| 6,995,677 | B2 | 2/2006 | Aronstam et al. | 340/606 |
| 6,995,685 | B2 | 2/2006 | Randall | 340/870.39 |
| 7,010,294 | B1 | 3/2006 | Pyotsia et al. | 455/420 |
| 7,036,983 | B2 | 5/2006 | Green et al. | 374/179 |
| 7,043,250 | B1 | 5/2006 | DeMartino | 455/445 |
| 7,058,542 | B2 | 6/2006 | Hauhia et al. | 702/183 |
| 7,073,394 | B2 | 7/2006 | Foster | 73/861.22 |
| 7,088,285 | B2 | 8/2006 | Smith | 342/124 |
| 7,109,883 | B2 | 9/2006 | Trimble et al. | 340/870.16 |
| 7,116,036 | B2 | 10/2006 | Balasubramaniam et al. | 310/322 |
| 7,136,725 | B1 | 11/2006 | Paciorek et al. | 700/295 |
| 7,173,343 | B2 | 2/2007 | Kugel | 290/1 R |
| 7,197,953 | B2 | 4/2007 | Olin | 73/866.5 |
| 7,233,745 | B2 | 6/2007 | Loechner | 398/128 |
| 7,262,693 | B2 | 8/2007 | Karschnia et al. | 340/508 |
| 7,271,679 | B2 | 9/2007 | Lundberg et al. | 333/24 |
| 7,301,454 | B2 | 11/2007 | Seyfang et al. | 340/539.26 |
| 7,319,191 | B2 * | 1/2008 | Poon et al. | 174/50.62 |
| 7,329,959 | B2 | 2/2008 | Kim et al. | 290/2 |
| 7,351,098 | B2 * | 4/2008 | Gladd et al. | 439/578 |
| 7,518,553 | B2 * | 4/2009 | Zhang et al. | 343/700 MS |
| 7,539,593 | B2 | 5/2009 | Machacek | 702/127 |
| 7,560,907 | B2 | 7/2009 | Nelson | 322/37 |
| 7,626,141 | B2 | 12/2009 | Rodriguez-Medina et al. | 219/260 |
| 7,726,017 | B2 | 6/2010 | Evans et al. | 29/854 |
| 7,983,049 | B2 | 7/2011 | Leifer et al. | 361/728 |
| 8,005,514 | B2 | 8/2011 | Saito et al. | 455/572 |
| 8,150,462 | B2 | 4/2012 | Guenter et al. | 455/557 |
| 2001/0025349 | A1 | 9/2001 | Sharood et al. | 713/340 |
| 2002/0011115 | A1 | 1/2002 | Frick | 73/718 |
| 2002/0029130 | A1 | 3/2002 | Eryurek et al. | 702/183 |
| 2002/0065631 | A1 | 5/2002 | Loechner | 702/188 |
| 2002/0082799 | A1 | 6/2002 | Pramanik | 702/130 |
| 2002/0095520 | A1 | 7/2002 | Wettstein et al. | 709/253 |
| 2002/0097031 | A1 | 7/2002 | Cook et al. | 323/273 |
| 2002/0105968 | A1 | 8/2002 | Pruzan et al. | 370/465 |
| 2002/0148236 | A1 | 10/2002 | Bell | 62/3.3 |
| 2002/0163323 | A1 | 11/2002 | Kasai et al. | 323/284 |
| 2003/0032993 | A1 | 2/2003 | Mickle et al. | 600/509 |
| 2003/0042740 | A1 | 3/2003 | Holder et al. | 290/1 A |
| 2003/0043052 | A1 | 3/2003 | Tapperson et al. | 640/825.37 |
| 2003/0079553 | A1 | 5/2003 | Cain et al. | 73/861.27 |
| 2003/0083038 | A1 | 5/2003 | Poon et al. | 455/344 |
| 2003/0097521 | A1 | 5/2003 | Pfandler et al. | 711/103 |
| 2003/0134161 | A1 | 7/2003 | Gore et al. | 429/12 |
| 2003/0143958 | A1 | 7/2003 | Elias et al. | 455/73 |
| 2003/0167631 | A1 * | 9/2003 | Hallenbeck | 29/835 |
| 2003/0171827 | A1 | 9/2003 | Keyes et al. | 700/19 |
| 2003/0199778 | A1 | 10/2003 | Mickle et al. | 600/509 |
| 2003/0204371 | A1 | 10/2003 | Sciamanna | 702/183 |
| 2004/0081872 | A1 | 4/2004 | Herman et al. | 429/26 |
| 2004/0085240 | A1 | 5/2004 | Faust | 342/124 |
| 2004/0086021 | A1 | 5/2004 | Litwin | 374/120 |
| 2004/0142733 | A1 | 7/2004 | Parise | 455/572 |
| 2004/0159235 | A1 | 8/2004 | Marganski et al. | 95/116 |
| 2004/0184517 | A1 | 9/2004 | Westfield et al. | 375/219 |
| 2004/0199681 | A1 | 10/2004 | Hedtke | 710/37 |
| 2004/0200519 | A1 | 10/2004 | Sterzel et al. | 136/238 |
| 2004/0203434 | A1 | 10/2004 | Karschnia et al. | 455/67.11 |
| 2004/0211456 | A1 | 10/2004 | Brown et al. | 136/243 |
| 2004/0214543 | A1 | 10/2004 | Osone et al. | 455/197.2 |
| 2004/0218326 | A1 | 11/2004 | Duren et al. | 361/93.1 |
| 2004/0242169 | A1 | 12/2004 | Albsmeier et al. | 455/91 |
| 2004/0249483 | A1 | 12/2004 | Wojsznis et al. | 700/52 |
| 2004/0259533 | A1 | 12/2004 | Nixon et al. | 455/414.1 |
| 2005/0011278 | A1 | 1/2005 | Brown et al. | 73/861.18 |
| 2005/0017602 | A1 | 1/2005 | Arms et al. | 310/339 |
| 2005/0023858 | A1 | 2/2005 | Bingle et al. | 296/76 |
| 2005/0029236 | A1 | 2/2005 | Gambino et al. | 219/121.69 |
| 2005/0040570 | A1 | 2/2005 | Asselborn | 266/99 |
| 2005/0046595 | A1 | 3/2005 | Blyth | 340/908 |
| 2005/0056106 | A1 | 3/2005 | Nelson et al. | 73/866.3 |
| 2005/0072239 | A1 | 4/2005 | Longsdorf et al. | 73/649 |
| 2005/0074324 | A1 | 4/2005 | Yoo | 415/4.3 |
| 2005/0076944 | A1 | 4/2005 | Kanatzidis et al. | 136/239 |
| 2005/0082949 | A1 | 4/2005 | Tsujiura | 310/339 |
| 2005/0099010 | A1 | 5/2005 | Hirsch | 290/42 |
| 2005/0106927 | A1 | 5/2005 | Goto et al. | 439/404 |
| 2005/0109395 | A1 | 5/2005 | Seberger | 137/8 |
| 2005/0115601 | A1 | 6/2005 | Olsen et al. | 136/212 |
| 2005/0118468 | A1 | 6/2005 | Adams et al. | 429/22 |
| 2005/0122653 | A1 | 6/2005 | McCluskey et al. | 361/92 |
| 2005/0130605 | A1 | 6/2005 | Karschnia et al. | 455/90.3 |
| 2005/0132808 | A1 | 6/2005 | Brown et al. | 73/592 |
| 2005/0134148 | A1 | 6/2005 | Buhler et al. | 310/339 |
| 2005/0139250 | A1 | 6/2005 | DeSteese et al. | 136/212 |
| 2005/0146220 | A1 | 7/2005 | Hamel et al. | 307/44 |
| 2005/0153593 | A1 | 7/2005 | Takayanagi et al. | 439/352 |
| 2005/0164684 | A1 | 7/2005 | Chen et al. | 455/414.1 |
| 2005/0197803 | A1 | 9/2005 | Eryurek et al. | 702/185 |
| 2005/0201349 | A1 | 9/2005 | Budampati | 370/342 |
| 2005/0208908 | A1 | 9/2005 | Karschnia et al. | 455/127.1 |
| 2005/0222698 | A1 | 10/2005 | Eryurek et al. | 700/90 |
| 2005/0228509 | A1 | 10/2005 | James | 700/19 |
| 2005/0235758 | A1 | 10/2005 | Kowal et al. | 73/891.29 |
| 2005/0242979 | A1 | 11/2005 | Hamilton et al. | 341/144 |
| 2005/0245291 | A1 * | 11/2005 | Brown et al. | 455/572 |
| 2005/0276233 | A1 | 12/2005 | Shepard et al. | 370/254 |
| 2005/0281215 | A1 | 12/2005 | Budampati et al. | 370/328 |
| 2005/0289276 | A1 | 12/2005 | Karschnia et al. | 710/305 |
| 2006/0002368 | A1 | 1/2006 | Budampati et al. | 370/351 |
| 2006/0028327 | A1 | 2/2006 | Amis | 340/431 |
| 2006/0036404 | A1 | 2/2006 | Wiklund et al. | 702/183 |
| 2006/0058847 | A1 | 3/2006 | Lenz et al. | 607/5 |
| 2006/0060236 | A1 | 3/2006 | Kim | 136/203 |
| 2006/0063522 | A1 | 3/2006 | McFarland | 455/423 |
| 2006/0077917 | A1 | 4/2006 | Brahmajosyula et al. | 370/310 |
| 2006/0092039 | A1 | 5/2006 | Saito et al. | 340/825.37 |
| 2006/0116102 | A1 * | 6/2006 | Brown et al. | 455/343.1 |
| 2006/0128689 | A1 | 6/2006 | Gomtsyan et al. | 514/217.01 |
| 2006/0131428 | A1 | 6/2006 | Wang et al. | 235/492 |
| 2006/0142875 | A1 | 6/2006 | Keyes et al. | 700/1 |
| 2006/0148410 | A1 | 7/2006 | Nelson et al. | 455/67.11 |
| 2006/0181406 | A1 | 8/2006 | Petite et al. | 340/521 |

(56) References Cited

U.S. PATENT DOCUMENTS

| | | | | |
|---|---|---|---|---|
| 2006/0227729 | A1 | 10/2006 | Budampati et al. | 370/278 |
| 2006/0274644 | A1 | 12/2006 | Budampati et al. | 370/216 |
| 2006/0274671 | A1 | 12/2006 | Budampati et al. | 370/254 |
| 2006/0278023 | A1 * | 12/2006 | Garneyer et al. | 73/862.333 |
| 2006/0282580 | A1 * | 12/2006 | Russell et al. | 710/62 |
| 2006/0287001 | A1 | 12/2006 | Budampati et al. | 455/552.1 |
| 2006/0290328 | A1 | 12/2006 | Orth | 323/218 |
| 2007/0006528 | A1 | 1/2007 | Diebold et al. | 48/197 R |
| 2007/0030816 | A1 | 2/2007 | Kolavennu | 370/252 |
| 2007/0030832 | A1 | 2/2007 | Gonia et al. | 370/338 |
| 2007/0039371 | A1 | 2/2007 | Omata et al. | 73/9 |
| 2007/0054630 | A1 | 3/2007 | Scheible et al. | 455/90.3 |
| 2007/0055463 | A1 | 3/2007 | Florenz et al. | 702/50 |
| 2007/0135867 | A1 | 6/2007 | Klosterman et al. | 607/60 |
| 2007/0229255 | A1 | 10/2007 | Loechner | 340/540 |
| 2007/0233283 | A1 | 10/2007 | Chen | 700/17 |
| 2007/0237137 | A1 | 10/2007 | McLaughlin | 370/389 |
| 2007/0273496 | A1 | 11/2007 | Hedtke | 340/506 |
| 2007/0275755 | A1 | 11/2007 | Chae et al. | 455/557 |
| 2007/0279009 | A1 | 12/2007 | Kobayashi | 320/166 |
| 2007/0280144 | A1 | 12/2007 | Hodson et al. | 370/312 |
| 2007/0280178 | A1 | 12/2007 | Hodson et al. | 370/338 |
| 2007/0280286 | A1 | 12/2007 | Hodson et al. | 370/466 |
| 2007/0280287 | A1 | 12/2007 | Samudrala et al. | 370/466 |
| 2007/0282463 | A1 | 12/2007 | Hodson et al. | 700/20 |
| 2007/0285224 | A1 | 12/2007 | Karschnia et al. | 340/538 |
| 2007/0288204 | A1 | 12/2007 | Gienke et al. | 702/188 |
| 2008/0010600 | A1 | 1/2008 | Katano | 715/748 |
| 2008/0030423 | A1 | 2/2008 | Shigemoto | 343/872 |
| 2008/0054645 | A1 | 3/2008 | Kulkarni et al. | |
| 2008/0079641 | A1 * | 4/2008 | Grunig et al. | 343/702 |
| 2008/0083446 | A1 | 4/2008 | Chakraborty et al. | 136/205 |
| 2008/0088464 | A1 | 4/2008 | Gutierrez | 340/606 |
| 2008/0114911 | A1 | 5/2008 | Schumacher | 710/72 |
| 2008/0123581 | A1 | 5/2008 | Wells et al. | |
| 2008/0141769 | A1 | 6/2008 | Schmidt et al. | 73/204.19 |
| 2008/0268784 | A1 | 10/2008 | Kantzes et al. | 455/66.1 |
| 2008/0273486 | A1 | 11/2008 | Pratt et al. | 370/328 |
| 2008/0280568 | A1 | 11/2008 | Kielb et al. | 455/74.1 |
| 2008/0310195 | A1 | 12/2008 | Seberger et al. | 363/26 |
| 2009/0015216 | A1 | 1/2009 | Seberger et al. | 323/234 |
| 2009/0066587 | A1 * | 3/2009 | Hayes et al. | 343/702 |
| 2009/0081957 | A1 | 3/2009 | Sinreich | 455/68 |
| 2009/0120169 | A1 | 5/2009 | Chandler et al. | 73/54.41 |
| 2009/0145656 | A1 | 6/2009 | Tschudin | 174/521 |
| 2009/0167613 | A1 * | 7/2009 | Hershey et al. | 343/702 |
| 2009/0195222 | A1 | 8/2009 | Lu et al. | 322/3 |
| 2009/0200489 | A1 * | 8/2009 | Tappel et al. | 250/492.3 |
| 2009/0250340 | A1 * | 10/2009 | Sasaki et al. | 204/298.02 |
| 2009/0253388 | A1 | 10/2009 | Kielb et al. | 455/117 |
| 2009/0260438 | A1 | 10/2009 | Hedtke | 73/579 |
| 2009/0309558 | A1 | 12/2009 | Kielb | 323/234 |
| 2009/0311975 | A1 | 12/2009 | Vanderaa et al. | 455/90.3 |

FOREIGN PATENT DOCUMENTS

| | | | |
|---|---|---|---|
| CN | 1 429 354 | A | 7/2003 |
| CN | 1 442 822 | A | 9/2003 |
| CN | 100386602 | C | 4/2005 |
| CN | 1969238 | | 5/2007 |
| DE | 2710211 | | 9/1978 |
| DE | 3340834 | A1 | 5/1985 |
| DE | 3842379 | | 6/1990 |
| DE | 196 22 295 | | 5/1996 |
| DE | 201 07 112 | U1 | 5/2001 |
| DE | 101 04 582 | A1 | 10/2001 |
| DE | 100 41 160 | | 3/2002 |
| DE | 102 21 931 | A1 | 5/2002 |
| DE | 10 2004 020 393 | | 11/2005 |
| EP | 0 518 916 | B1 | 2/1991 |
| EP | 0 524 550 | A1 | 1/1993 |
| EP | 0729294 | | 8/1996 |
| EP | 0 895 209 | A1 | 2/1999 |
| EP | 0 945 714 | | 9/1999 |
| EP | 1 202 145 | A1 | 5/2002 |
| EP | 1 192 614 | | 1/2003 |
| EP | 1 293 853 | A1 | 3/2003 |
| EP | 1879294 | | 1/2008 |
| FI | 118699 | B | 2/2008 |
| GB | 1 397 435 | A | 11/1975 |
| GB | 2 403 043 | | 6/2004 |
| JP | 2-35803 | | 2/1990 |
| JP | 02067794 | | 7/1990 |
| JP | 4-335796 | | 11/1992 |
| JP | 06 199284 | A | 7/1994 |
| JP | 8-125767 | | 5/1996 |
| JP | 8-249997 | | 9/1996 |
| JP | 09-182308 | | 7/1997 |
| JP | 2001-524226 | | 11/2001 |
| JP | 2002369554 | | 12/2002 |
| JP | 2003/042881 | | 2/2003 |
| JP | 2003-051894 | | 2/2003 |
| JP | 2003051894 | | 2/2003 |
| JP | 2003134261 | | 5/2003 |
| JP | 2003-195903 | | 7/2003 |
| JP | 2004021877 | | 1/2004 |
| JP | 2004 146254 | | 5/2004 |
| JP | 2004208476 | | 7/2004 |
| JP | 2004-317593 | | 11/2004 |
| JP | 2005-122744 | | 5/2005 |
| JP | 2005207648 | | 7/2005 |
| JP | 2006-180603 | | 7/2006 |
| JP | 2007-200940 | | 8/2007 |
| JP | 2008-17663 | | 1/2008 |
| JP | 2008-504790 | | 2/2008 |
| RU | 2 131 934 | C1 | 6/1999 |
| RU | 2168062 | | 5/2001 |
| RU | 2003128989 | | 1/2007 |
| WO | WO 91/13417 | | 9/1991 |
| WO | WO 95/07522 | | 3/1995 |
| WO | WO 99/53286 | | 10/1999 |
| WO | WO 01/01742 | | 1/2001 |
| WO | WO 01/48723 | | 7/2001 |
| WO | WO 2001/51836 | | 7/2001 |
| WO | WO 02/05241 | | 1/2002 |
| WO | WO 03/023536 | | 3/2003 |
| WO | WO 03/089881 | | 10/2003 |
| WO | WO 2004/038998 | | 5/2004 |
| WO | WO 2004/082051 | | 9/2004 |
| WO | WO 2004/094892 | | 11/2004 |
| WO | WO 2005/060482 | | 7/2005 |
| WO | WO 2005/086331 | | 9/2005 |
| WO | WO 2006/109362 | | 10/2006 |
| WO | WO 2007/002769 | | 1/2007 |
| WO | WO 2007/031435 | | 3/2007 |
| WO | WO 2007/037988 | | 4/2007 |
| WO | WO 2008/0098583 | | 8/2008 |
| WO | WO 2009/003146 | | 12/2008 |
| WO | WO 2009/003148 | | 12/2008 |
| WO | WO 2009/063056 | | 5/2009 |

OTHER PUBLICATIONS

U.S. Appl. No. 12/855,128, filed Aug. 12, 2010.

U.S. Appl. No. 12/870,448, filed Aug. 17, 2010.

Office Action from Chinese patent Application No. 200580006438.X transmitted Jul. 9, 2008.

Examiner's Consultation from European patent Application No. 05724190.3, dated Jun. 30, 2008.

The second Office Action from Chinese patent Application No. 2005800142124 filed May 5, 2005.

First Office Action from Russian patent application No. 2006145434 dated Oct. 5, 2007.

Office Action from European Application No. 05746241.8, dated Aug. 29, 2007.

Decision on refusal to grant a patent for invention for Russian patent application No. 2006145434, filed May 5, 2005.

"Wireless R&D Aims to Boost Traffic," by M. Moore, InTech with Industrial Computing, Feb. 2002, pp. 40-41.

"System Checks Faraway Machines' Health," by J. Strothman, InTech with Industrial Computing, Feb. 2002, pp. 42-43.

(56) References Cited

OTHER PUBLICATIONS

Notification of Transmittal of the International Search Report or the Declaration—PCT/US03/10403 dated Aug. 13, 2003.
"Wireless Management Toolkit XYR 5000", by Honeywell International Inc., Phoenix, Arizona, 3 pgs., Oct. 2003.
"Wireless Analog Input Transmitters XYR 5000", by Honeywell International Inc., Phoenix, Arizona, 4 pgs., Oct. 2003.
"Quad Analog Output Module Installation and User's Manual", by Honeywell International Inc., Phoenix, Arizona, pp. ii, iii, iv and 1-12, Dec. 2003.
International Search Report and Written Opinion of Application No. PCT/US2005/015848 dated Aug. 10, 2005.
The third Office Action from Chinese patent Application No. 200580014212.4, dated Dec. 19, 2008.
"Wireless Dual Analog Input Interface Transmitter Installation and User's Manual", by Honeywell International Inc., Phoenix, Arizona, pp. ii-vi and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, 4 pgs. May 2003.
"Wireless Instrumentation, Multi-Input Field Unit", by Accutech, 2 pgs., Dec. 2003.
"Quad Analog Output Module", by Accutech, 1 pg. Dec. 2003.
3 pages from Website www.chemicalprocessing.com, Apr. 2004.
The International Search Report and Written Opinion in Appln No: PCT/US2005/021757 dated Feb. 13, 2006.
International Search Report for International Application No. PCT/US 03/27561, filed Mar. 9, 2003, dated Jun. 15, 2004.
2002 Microchip Technology Inc., "Stand-Alone CAN Controller with SPI™ Interface," pp. 1-75, Mar. 1, 2002.
Rosemount Reference Manual 00809-0100-4022,Rev AA, Jul. 2002, "Model 4600 Oil & Gas Panel Transmitter," 65 pages.
Transmitter Schematic, Sold Jul. 2002, 5 pages.
4 pages from Website http://content.honeywell.com/imc/eznews/eznews0403/news.htm 2004.
Notification of Transmittal of the International Search Report and the Written Opinion for the international patent application No. PCT/US2010/047463 dated Dec. 1, 2010.
Notification of Transmittal of the International Search Report and the Written Opinion of the International Searching Authority for International Application No. PCT/US2006/025206 dated Nov. 10, 2006.
"Mechatronic Drives in Mobile Hydraulics," Internet Article, Soncebox News. No. 4, Oct. 2004.
Office Action from European Application No. 05853808.3, dated Nov. 6, 2007.
The International Search Report and Written Opinion in Application No. PCT/US2009/003619, dated Sep. 30, 2009.
USA & Metric Thread Standards http://www.carrlarte.com/Catalog/index.cfm/29425071F0B221118070C1C513906103E0B05543B0B012009083C3B285357474A2D020609090C0015312A36515F554A5B.
The International Search Report and Written Opinion in Application No. PCT/US2006/035728, dated Jan. 12, 2007.
"Notification of Transmittal of the International Search Report and the Written Opinion of the International Searching Authority" for PCT/US2008/011451 dated Mar. 30, 2009.
The International Search Report and Written Opinion in Application No. PCT/US2009/003616, dated Jan. 13, 2010.
First Examination Report for Indian patent application No. 4676/CHENP/2006 dated Apr. 17, 2009.
Second Examination Report for Indian patent application No. 4676/CHENP/2006 dated Apr. 8, 2010.
The International Search Report and Written Opinion in Application No. PCT/US2009/003636, dated Oct. 6, 2009.
The International Search Report and Written Opinion in Application No. PCT/US2009/003621, dated Sep. 30, 2009.
Rejection Notice for Japanese patent application No. 2007527282 dated Jul. 22, 2010.
Summons to attend oral proceedings for the European application No. 05746241.8 dated May 26, 2010.
The sixth Office Action from Chinese application No. 2005800014212.4, dated Aug. 17, 2010.
Conclusion and Notification on rehearing for Russian patent application No. 2006145434/09 issued on Sep. 17, 2010.
The seventh Office Action from Chinese patent application No. 200580014212.4 issued on Jan. 31, 2011.
The fourth Office Action from Chinese patent application No. 200580014212.4 issued on Jul. 24, 2009.
Official Letter from Mexican patent application No. PA/A/2006/013488 dated Jun. 25, 2009.
Notification of Transmittal of the International Search Report and the Written Opinion for International application No. PCT/US2009/062152 dated Jun. 2, 2010.
First Office Action for Chinese application No. 200780018710.5 dated May 12, 2010.
First Office Action for Chinese patent application 200680015575.4, filed Jun. 27, 2006.
Search Report and Written Opinion for international patent application No. PCT/US2009/002476, dated Apr. 21, 2009.
Third Office Action from Chinese patent application No. 200580006438.X, dated Sep. 28, 2009.
Second Official Action from Russian patent application No. 2008116682, dated Apr. 13, 2009.
First Official Action from Russian patent application No. 2006134646, dated Mar. 12, 2008.
First Official Action from Russian patent application No. 2008103014, dated Jun. 9, 2009.
First Communication from European patent application No. 06803540.1, dated Jun. 30, 2008.
Fifth Office Action from Chinese patent application No. 200580014212.4, dated Nov. 13, 2009.
Second Office Action for Chinese patent application No. 200680015575.4, dated Sep. 25, 2009.
Third Official Action for Russian patent application No. 2008116682, dated Sep. 11, 2009.
Notification on Results of Examining the Invention for Patentability from Russian patent application No. 2006145434 dated Aug. 1, 2008.
First Rejection Notice issued for Japanese patent application No. 2007-527282 dated Dec. 14, 2009.
Second Office Action from Russian patent application No. 2006145434 dated Apr. 2, 2008.
First Office Action from Chinese Patent Application No. 2005800142124 dated Mar. 14, 2008.
First Official Action from Russian patent application 2008116682, dated Jan. 16, 2009.
Second Office Action from Chinese patent application 200580006438.X, dated Apr. 10, 2009.
Examination Report of the European Patent Office in Application No. 05724190.3 dated Aug. 1, 2007.
The Official Communication from European patent application No. 05746241.8 dated Nov. 12, 2010.
The Minutes in accordance with Rule 124(4) EPC for European application No. 05746241.8 dated Nov. 4, 2010.
Communication pursuant to Rules 161 and 162 EPC from European patent application No. 09767057.4 dated Jan. 26, 2011.
Communication pursuant to Rules 161 and 162 EPC from European patent application No. 09767063.2 dated Jan. 28, 2011.
Communication from corresponding EP application No. 08837236.2 dated Nov. 3, 2010.
Notification of Transmittal of the International Search Report and the Written Opinion for the international patent application No. PCT/US2010/047444 dated Dec. 10, 2010.
Third Office Action for Chinese patent application No. 200680015575.4, dated Jun. 2010.
Fourth Official Action for Russian patent application No. 2008116682, dated Dec. 18, 2009.
English machine translation of JP2004208476 A.
"Every Little Helps." Economist, vol. 278, No. 8469, p. 78, Mar. 18, 2006.

(56) References Cited

OTHER PUBLICATIONS

"Thermal Design and Heat Sink Manufacturing & Testing—Total Thermal and Heat Sink . . . ," http://www.enertron-inc/enertron-products/integrated-heat-sink.php, Mar. 31, 2006.
Zahnd et al., "Piezoelectric Windmill: A Novel Solution to Remote Sensing," Japanese Journal of Applied Physics, v. 44, No. 3, p. L104-L105, 2005.
"Heat Pipe—Wikipedia, the free encyclopedia," http://en.wikipedia.org/wiki/Heat_pipe, Mar. 31, 2006.
"High Power Single PSE Controller With Internal Switch," Linear Technology LTC4263-1, p. 1-20.
Office Action from European patent application No. 07837769.4, dated Jul. 14, 2009.
First Office Action from Australian patent application No. 2005248759, dated Apr. 30, 2009.
Second Office Action from Australian patent application No. 2005248759, dated Aug. 28, 2009.
Decision on Refusal to Grant from Russian patent application No. 2006145434 dated Feb. 18, 2011.
Office Action from related European Application No. EP 09767062.4, dated Jul. 13, 2011, 5pgs.
Written Opinion and Search Report from the related Singapore patent application No. 201009226-0 dated Mar. 16, 2012.
Office Action from the related Russian patent application No. 2011101364 dated Feb. 8, 2012.
Second Office Action for the related Chinese patent application No. 200680035248.5 dated Oct. 19, 2011, 22 pages.
First Office Action from the related Chinese patent application No. 200980122611.0 dated Nov. 23, 2011.
Official Action for the related Russian patent application No. 2011101386 transmitted Dec. 23, 2011.
Official Action from Canadian patent application No. 2563337 dated Sep. 4, 2012.
The International Search Report from PCT Application No. PCT/US2011/047026, dated Jul. 11, 2011, 4 pgs.
The Written Opinion from International Search Report from PCT Application No. PCT/US2011/047026, dated Jul. 11, 2011, 8 pgs.
Office Action from Chinese Patent Application No. 200880110323.9, dated Jan. 29, 2012.
Written Opinion from Singapore Patent Application No. 201009093-4, dated Feb. 20, 2012.
Communication Pursuant to Rules 161(1) and 162 EPC for application Serial No. EP 09767062.4, dated Jan. 27, 2011.
Chinese Office Action from CN200980122835.1, dated Jul. 3, 2012.
Chinese Office Action from CN200980122761.1, dated Aug. 31, 2012.
First Office Action from Japanese patent application No. 2011514603, dated Jul. 10, 2012.
First Office Action from Chinese patent application No. 200980122613.X, dated Aug. 15, 2012.
Second Office Action from Chinese patent application No. 200980122611.0 dated Aug. 20, 2012.
Communication Pursuant to Rules 161(1) and 162 Epc for application Serial No. EP 10752246.8, dated May 3, 2012.
Written Opinion for the related Singapore patent application No. 2010092278 dated Feb. 16, 2012.
Written Opinion for the related Singapore patent application No. 2010092245 dated Jan. 6, 2012.
Japanese Office Action from JP 2011-514605, dated Jun. 19, 2012.
Communication Pursuant to Rules 161(1) and 162 EPC for application Serial No. EP 10765871.8, dated Apr. 27, 2012.
Office Action from Russian patent application No. 2011101386 dated Apr. 23, 2012, 4 pages.
Official Action from the corresponding Canadian patent application No. 2726613 dated Jan. 11, 2013.
Official Action from the related Canadian patent application No. 2726608 dated Dec. 5, 2012.
Examination Report from the related Singapore patent application No. 2010092278 dated Jan. 7, 2013.
Examination Report for the related Singapore application No. 201009226-0 dated Oct. 12, 2012. 11 pages.
Official Action from related Russian patent application No. 2009139488, dated Oct. 8, 2012. 3 pages.
Invitation to Response to Written Opinion for Singapore application No. 201009093-4 dated Nov. 5, 2012.
Decision of Rejection (final rejection) for Japanese Patent Application No. 2011-514604, dated Jan. 29, 2013, 8 pages.
Second Office Action for Chinese Patent Application No. 200980122835.1, dated Mar. 15, 2013, 20 pages.
Official Action for Canadian Patent Application No. 2,726,601, dated Apr. 12, 2013, 3 pages.
Second Office Action from Chinese patent application No. 200980I22613.X, dated May 9, 2013.
First Office Action from the related Japanese patent application No. 2012527988, dated May 14, 2013.
Office Action from the relaated Japanese patent application No. 2012527994 dated Jun. 11, 2013.
Third Office Action in Chinese Appln. No. 200980122835.1 dated Sep. 24, 2013. 21 pages including English translation.

* cited by examiner

FORM FACTOR AND ELECTROMAGNETIC INTERFERENCE PROTECTION FOR PROCESS DEVICE WIRELESS ADAPTERS

CROSS-REFERENCE TO RELATED APPLICATIONS

The present application is based on and claims the benefit of U.S. provisional patent application Ser. No. 61/073,091, filed Jun. 17, 2008, and U.S. provisional application Ser. No. 61/073,098, filed Jun. 17, 2008, the contents of which are hereby incorporated by reference in their entireties.

BACKGROUND

In industrial settings, control systems are used to monitor and control inventories of industrial and chemical processes, and the like. Typically, the control system performs these functions using field devices distributed at key locations in the industrial process and coupled to the control circuitry in the control room by a process control loop. Field devices generally perform a function, such as sensing a parameter or operating upon the process, in a distributed control or process monitoring system.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Typically, each field device also includes communication circuitry that is used for communicating with a process control room, or other circuitry, over a process control loop. In some installations, the process control loop is also used to deliver a regulated current and/or voltage to the field device for powering the field device. The process control loop also carries data, either in an analog or digital format.

Traditionally, analog field devices have been connected to the control room by two-wire process control current loops, with each device connected to the control room by a single two-wire control loop. Typically, a voltage differential is maintained between the two wires within a range of voltages from 12-45 volts for analog mode and 9-50 volts for digital mode. Some analog field devices transmit a signal to the control room by controlling the current running through the current loop to a current proportional to the sensed process variable. Other field devices can perform an action under the control of the control room by modulating the magnitude of the current through the loop. In addition to, or in the alternative, the process control loop can carry digital signals used for communication with field devices.

In some installations, wireless technologies have begun to be used to communicate with field devices. Wireless operation simplifies field device wiring and set-up. However, the majority of field devices are hardwired to a process control room and does not use wireless communication techniques.

Industrial process plants often contain hundreds or even thousands of field devices. Many of these field devices contain sophisticated electronics and are able to provide more data than the traditional analog 4-20 mA measurements. For a number of reasons, cost among them, many plants do not take advantage of the extra data that may be provided by such field devices. This has created a need for a wireless adapter for such field devices that can attach to the field devices and transmit data back to a control system or other monitoring or diagnostic system or application via a wireless network.

SUMMARY

A process device wireless adapter includes a wireless communications module, a metallic housing, and an antenna. The wireless communications module is configured to communicatively couple to a process device and to a wireless receiver. The metallic housing surrounds the wireless communication module and has a first end and a second end. The first end is configured to attach to the process device. In one embodiment, the metallic shield contacts the housing second end such that the metallic shield and the housing form a continuous conductive surface. The antenna is communicatively coupled to the wireless communications module and separated from the wireless communications module by the metallic shield. Preferably, the wireless communications module illustratively includes a printed circuit board that has a length that is greater than its width.

DETAILED DESCRIPTION OF ILLUSTRATIVE EMBODIMENTS

Embodiments of the present invention generally include a wireless adapter configured to couple to a process device and to communicate to a process control room or a remote monitoring system or diagnostic application running on a computer. Process devices are commonly installed in areas that have limited access. Certain embodiments described herein include wireless adapters having improved form factors. The improved form factors enable wireless adapters to be coupled to process devices in a wide variety of environments, including environments that may not otherwise allow for a wireless adapter to be coupled to a process device. Process devices are also commonly installed in environments having electromagnetic interference (EMI) that may negatively impact the performance or operation of a wireless adapter. Some embodiments described herein include wireless adapters having electrically conductive enclosures that reduce or eliminate negative effects from EMI.

Figure 1:
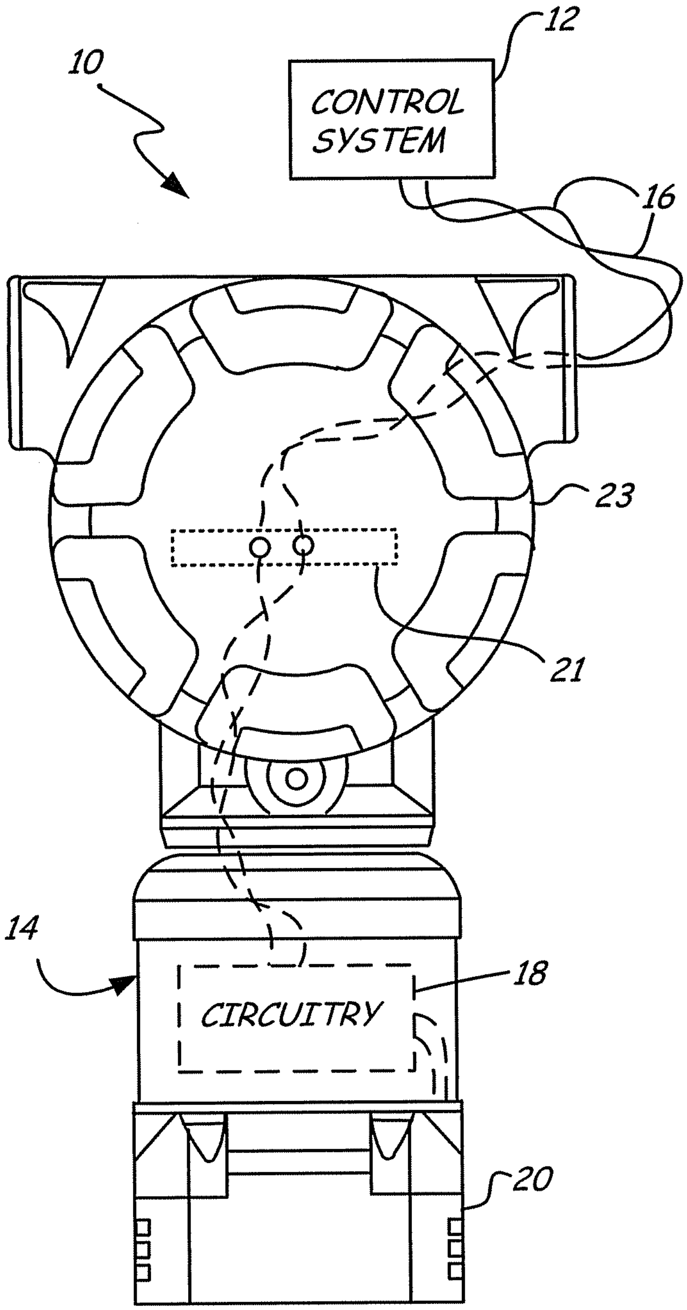
FIG. 1 (PRIOR ART)
FIG. 1 is a diagrammatic view of an exemplary field device with which a wireless adapter in accordance with the present invention is useful.
Figure 2:
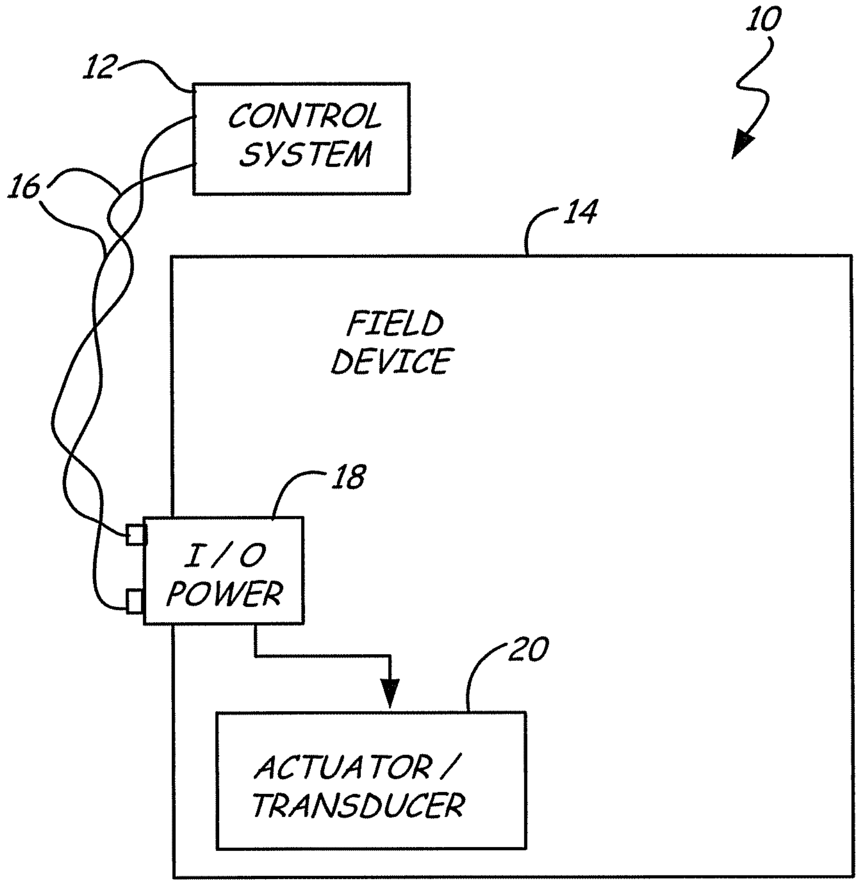
FIG. 2 (PRIOR ART)
FIG. 2 is a block diagram of the field device shown in FIG. 1.

FIGS. 1 and 2 are diagrammatic and block diagram views of an exemplary field device with which a wireless adapter in accordance with an embodiment of the present invention is useful. Process control or monitoring system 10 includes a control room or control system 12 that couples to one or more field devices 14 over a two-wire process control loop 16. Examples of process control loop 16 include analog 4-20 mA communication, hybrid protocols which include both analog and digital communication such as the Highway Addressable Remote Transducer (HART®) standard, as well as all-digital protocols such as the FOUNDATION™ Fieldbus standard. Generally process control loop protocols can both power the field device and allow communication between the field device and other devices.

In this example, field device 14 includes circuitry 18 coupled to actuator/transducer 20 and to process control loop 16 via terminal board 21 in housing 23. Field device 14 is illustrated as a process variable generator in that it couples to a process and senses an aspect, such as temperature, pressure, pH, flow, or other physical properties of the process and provides and indication thereof. Other examples of field devices include valves, actuators, controllers, and displays.

Generally field devices are characterized by their ability to operate in the "field" which may expose them to environmental stresses, such as temperature, humidity and pressure. In addition to environmental stresses, field devices must often withstand exposure to corrosive, hazardous and/or even explosive atmospheres. Further, such devices must also operate in the presence of vibration and/or electromagnetic interference. Field devices of the sort illustrated in FIG. 1 represent a relatively large installed base of legacy devices, which are designed to operate in an entirely wired manner.

Figure 3:
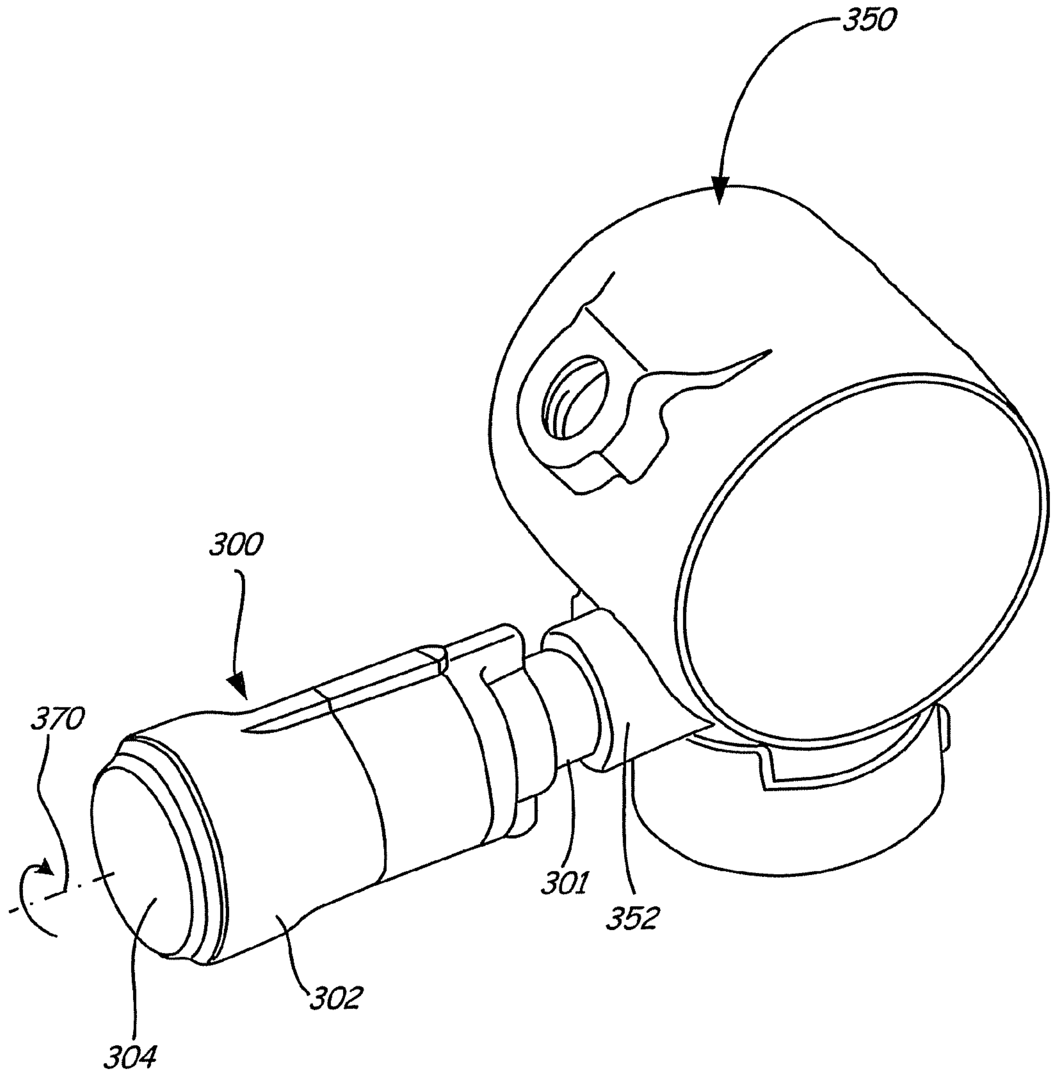
FIG. 3 is a perspective view of an improved form factor wireless adapter coupled to a process device.
Figure 4:
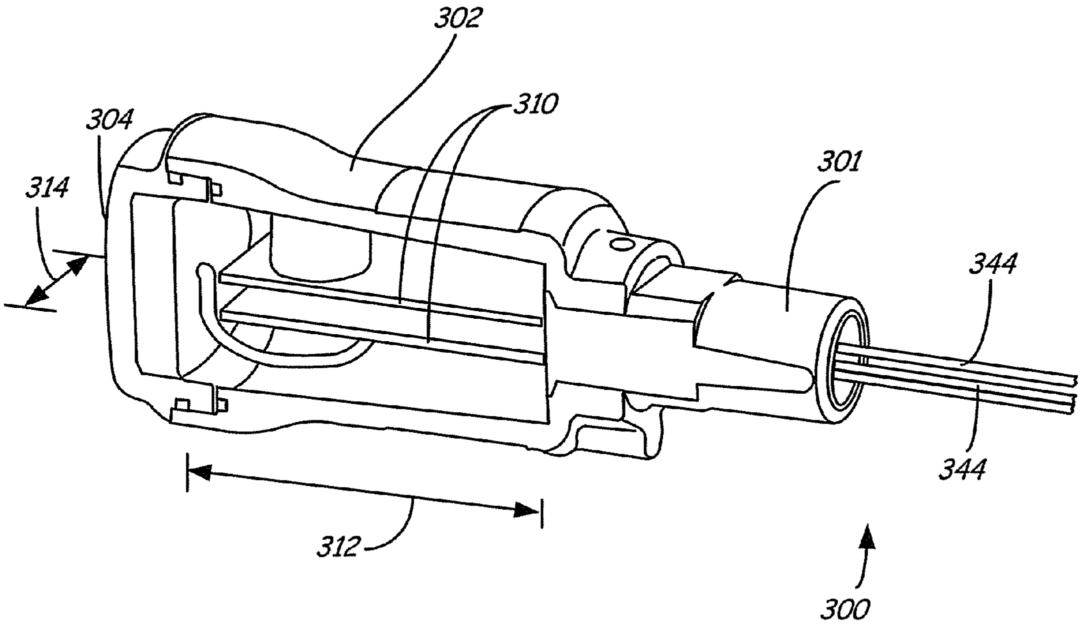
FIG. 4 is a cross-sectional perspective view of the wireless adapter of FIG. 3.

FIG. 3 is a perspective view of an improved form factor wireless adapter 300 coupled to a process device 350, and FIG. 4 is a cross-sectional perspective view of adapter 300. Adapter 300 includes a mechanical attachment region 301 (e.g. a region having a threaded surface) that attaches to device 350 via a standard field device conduit 352. Examples of suitable conduit connections include ½-14 NPT, M20×1.5, G½, and ⅜-18 NPT. Adapter 300 is illustratively attached to or detached from device 350 by rotating adapter 300 about an axis of rotation 370. Attachment region 301 is preferably hollow in order to allow conductors 344 to couple adapter 300 to device 350.

Adapter 300 includes an enclosure main body or housing 302 and end cap 304. Housing 302 and cap 304 provide environmental protection for the components included within adapter 300. As can be seen in FIG. 4, housing 302 encloses or surrounds one or more wireless communications circuit boards 310. Each circuit board 310 is illustratively rectangularly shaped and has a length 312 that extends along or is parallel to axis of rotation 370 (shown in FIG. 3). Each board 310 also has a width 314 that extends radially outward from or is perpendicular to axis of rotation 370.

In an embodiment, circuit board length 312 and width 314 are adjusted or selected to enable adapter 300 to be coupled to process device 350 in a wide variety of environments. For instance, process device 350 may be in an environment that only has a limited amount of space for the width 314 of a circuit board 310. In such a case, the width 314 of the circuit board is decreased such that it can fit within the environment. The length 312 of the circuit board is correspondingly increased to compensate for the reduced width 314. This enables circuit board 310 to be able to include all of the needed electronic components while having a form factor that fits within the process device environment. In one embodiment, length 312 is greater than width 314 (i.e. the ratio of length to width is greater than one). Embodiments of the present disclosure are not however limited to any particular ratios or dimensions. It should also be noted that the length and/or diameter of housing 302 and cap 304 are illustratively adjusted such that the overall length and diameter/width of wireless adapter 300 is minimized (i.e. the length and diameter of housing 302 and cap 304 are sized only as large as is needed to accommodate the enclosed components).

Figure 5:
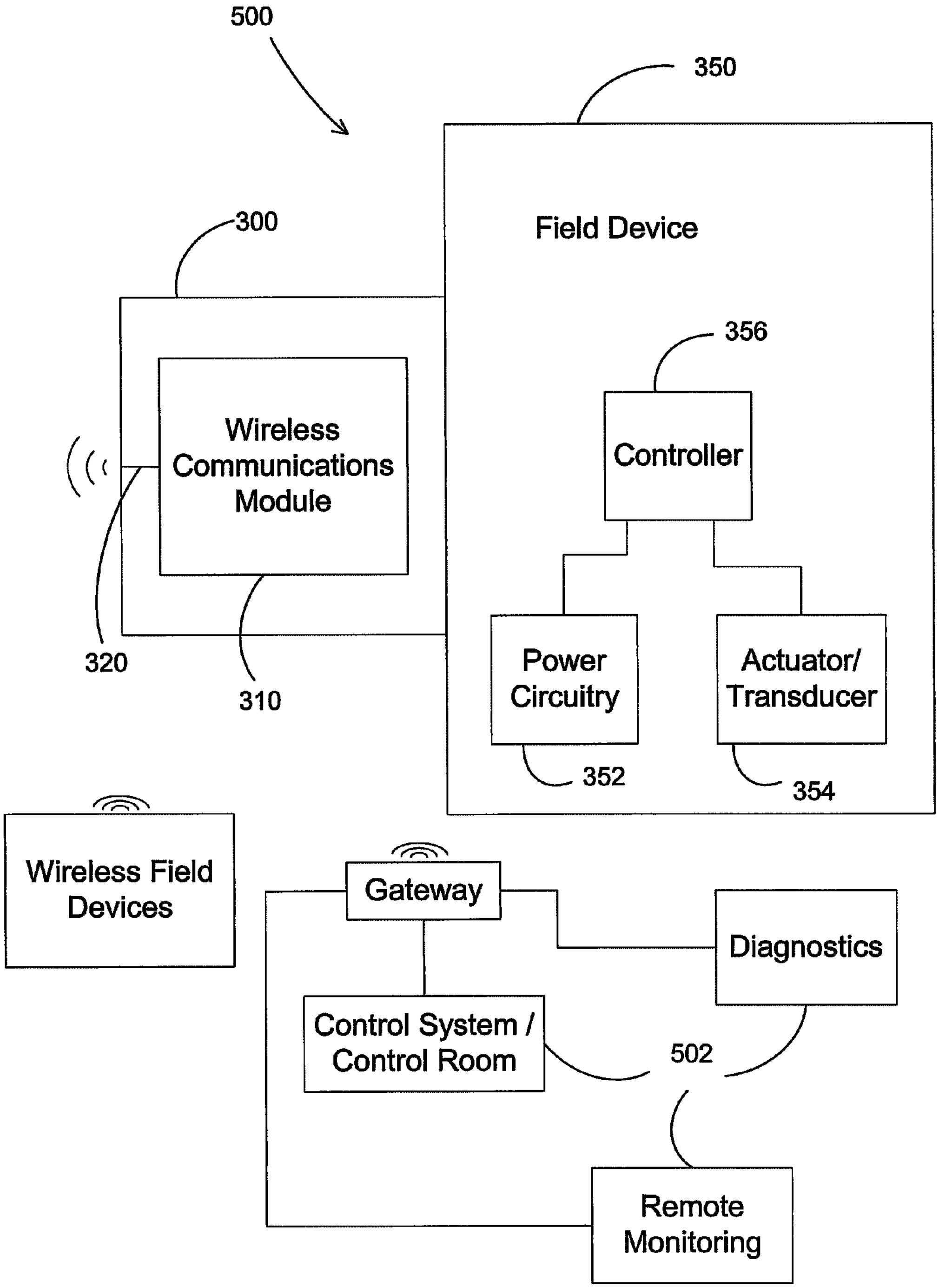
FIG. 5 is a simplified block diagram of a process control or monitoring system that includes a wireless adapter.

FIG. 5 is a simplified block diagram of a process control or monitoring system 500 in which a control room or control system 502 communicatively couples to field device 350 through wireless adapter 300. Wireless adapter 300 includes a wireless communications module 310 and an antenna 320. Wireless communications module 310 is coupled to process device controller 356 and interacts with external wireless devices (e.g. control system 502 or other wireless devices or monitoring systems as illustrated in FIG. 5) via antenna 320 based upon data from controller 356. Depending upon the application, wireless communications module 310 may be adapted to communicate in accordance with any suitable wireless communication protocol including, but not limited to: wireless networking technologies (such as IEEE 802.11b wireless access points and wireless networking devices built by Linksys of Irvine, Calif.); cellular or digital networking technologies (such as Microburst® by Aeris Communications Inc. of San Jose, Calif.); ultra wide band, free space optics, Global System for Mobile Communications (GSM), General Packet Radio Service (GPRS); Code Division Multiple Access (CDMA); spread spectrum technology, infrared communications techniques; SMS (Short Messaging Service/text messaging); a known Bluetooth Specification, such as Bluetooth Core Specification Version 1.1 (Feb. 22, 2001), available from the Bluetooth SIG (www.bluetooth.com); and the Wireless HART® Specification published by the Hart Communication Foundation, for example. Relevant portions of the Wireless HART® Specification include: HCF_Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155—Wireless Command Specification; and HART Specification 290—Wireless Devices Specification. Further, known data collision technology can be employed such that multiple units can coexist within wireless operating range of one another. Such collision prevention can include using a number of different radio-frequency channels and/or spread spectrum techniques.

Wireless communications module 310 can also include transducers for a plurality of wireless communication methods. For example, primary wireless communication could be performed using relatively long distance communication methods, such as GSM or GPRS, while a secondary, or additional communication method could be provided for technicians, or operators near the unit, using for example, IEEE 802.11b or Bluetooth.

Field device 350 further includes power circuitry 352 and an actuator/transducer 354. In one embodiment, power from module 352 energizes controller 356 to interact with actuator/transducer 354 and wireless communications module 310. Power from module 352 may also energize components of wireless adapter 300. Process device controller 356 and wireless communications module 310 illustratively interact with each other in accordance with a standard industry protocol such as 4-20 mA, HART®, FOUNDATION™ Fieldbus, Profibus-PA, Modbus, or CAN. Alternatively, the wireless adapter may be powered by its own power source such as a battery or from other sources such as from energy scavenging.

Figure 6:
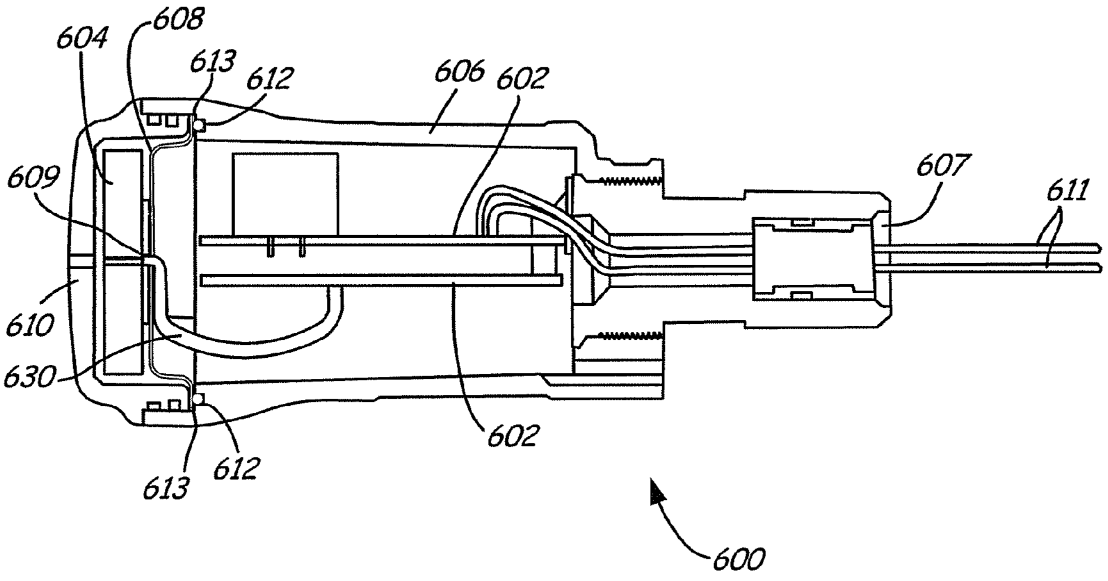
FIG. 6 is a cross-sectional view of a wireless adapter that reduces or eliminates electromagnetic interference in accordance with an embodiment of the present invention.

FIG. 6 is a cross-sectional view of a wireless adapter 600 that reduces or eliminates electromagnetic interference (EMI) in accordance with an embodiment of the present invention. Adapter 600 includes wireless communications module electronics 602 (e.g. one or more printed circuit boards), antenna 604, metallic housing or enclosure 606, a metallic shield 608, non-metallic end cap 610 (e.g. a plastic radome), and a conductive elastomeric gasket 612. Metallic enclosure 606 is illustratively made from metalized plastic or from a metal such as aluminum and has a cylindrical shape. Metallic shield 608 is illustratively made from a plastic plated with a conductive material or from a metal such as stamped sheet metal.

Gasket 612 fits within an annular ring 613 of enclosure 606. Gasket 612 is in contact with both metallic enclosure 606 and metallic shield 608 such that the three components form a continuous conductive surface. This conductive surface protects wireless communications module 602 from EMI.

Metallic shield 608 has a small hole or aperture 609. Aperture 609 allows for an electrical connection 630 (e.g. a coaxial cable) to pass through shield 608 and to connect antenna 604 to wireless communications module 602. Alternatively, antenna 604 can be formed integrally with module 602, for example in the form of traces routed around an outside edge of a circuit board. In such a case, the integrally formed antenna 604 is passed through shield 608 through aperture 609.

Non-metallic end cap 610 and metallic shield 608 surround antenna 604 and provide physical protection (e.g. environmental protection) for the antenna. Wireless signals are able to pass through non-metallic end cap 610. This allows for antenna 604 to transmit and receive wireless signals. In an embodiment, shield 608 and antenna 604 are designed such that shield 608 is part of the ground plane of antenna 604.

Metallic enclosure 606 has a small hole or aperture 607. Aperture 607 allows for electrical conductors or connections 611 to pass through. Connections 611 illustratively couple wireless adapter 600 to a process device such that communication signals may be transferred between wireless adapter 600 and the process device. Adapter 600 illustratively communicates with a process device in accordance with an industry protocol, such as those set forth above (e.g. HART®). Connections 611 may also supply wireless adapter 600 with electrical power (e.g. current or voltage).

Figure 7:
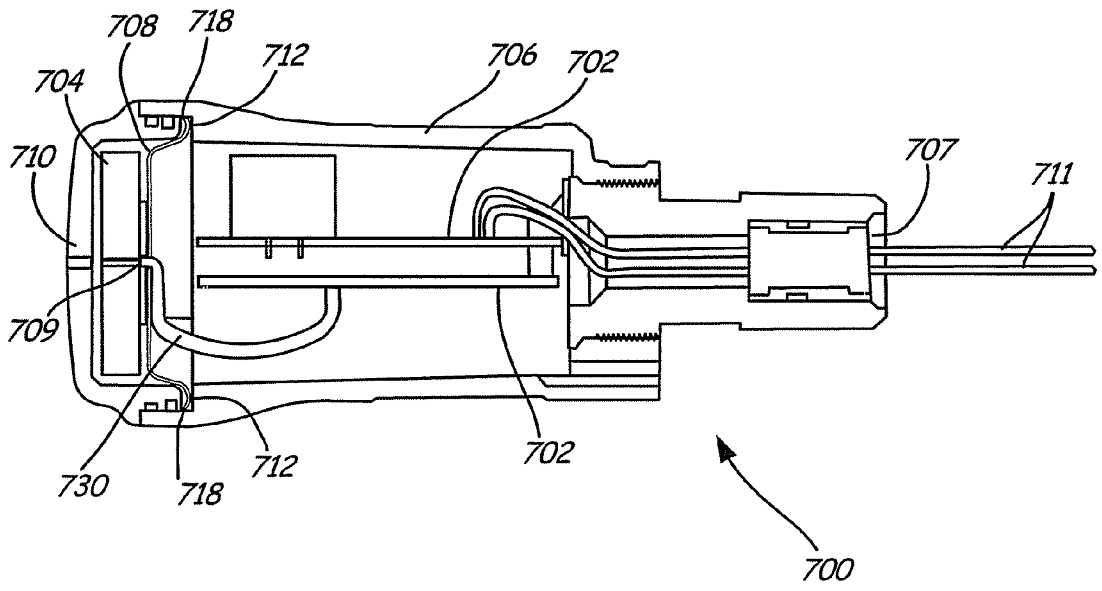
FIG. 7 is a cross-sectional view of another wireless adapter that reduces or eliminates electromagnetic interference in accordance with an embodiment of the present invention.

FIG. 7 is a cross-sectional view of another wireless adapter 700 that reduces or eliminates EMI in accordance with an embodiment of the present invention. Adapter 700 includes many of the same or similar components as adapter 600 and is numbered accordingly. Adapter 700 does not include a conductive gasket like adapter 600. Instead, metallic shield 708 has electrically conductive tabs or spring fingers 718. Fingers 718 fit within the enclosure annular ring 712 such that shield 708 and enclosure 706 form a continuous conductive surface that surrounds wireless communications module 702. The surrounding conductive surface protects electronics within module 702 from EMI.

In another embodiment of a wireless adapter, the electronics enclosure (e.g. enclosure 606 in FIG. 6 and enclosure 706 in FIG. 7) is made from a non-metallic material. The wireless adapter communications electronics (e.g. module 602 in FIG. 6 and module 702 in FIG. 7) are illustratively protected from EMI by a separate metallic shield that is within the electronics enclosure and that surrounds the electronics.

In yet another embodiment of a wireless adapter, the adapter does not include an end cap (e.g. end cap 610 in FIG. 6) that encloses an antenna. Instead, a "rubber duck" style whip antenna is used. The whip antenna is positioned or placed adjacent to the adapter shield (e.g. shield 608 in FIG. 6) and is left exposed to the environment.

Wireless adapters are illustratively made to meet intrinsic safety requirements and provide flame-proof (explosion-proof) capability. Additionally, wireless adapters optionally include potting within their electronic enclosures to further protect the enclosed electronics. In such a case, the metallic shields of the wireless adapters may include one or more slots and/or holes to facilitate potting flow.

Figure 8:
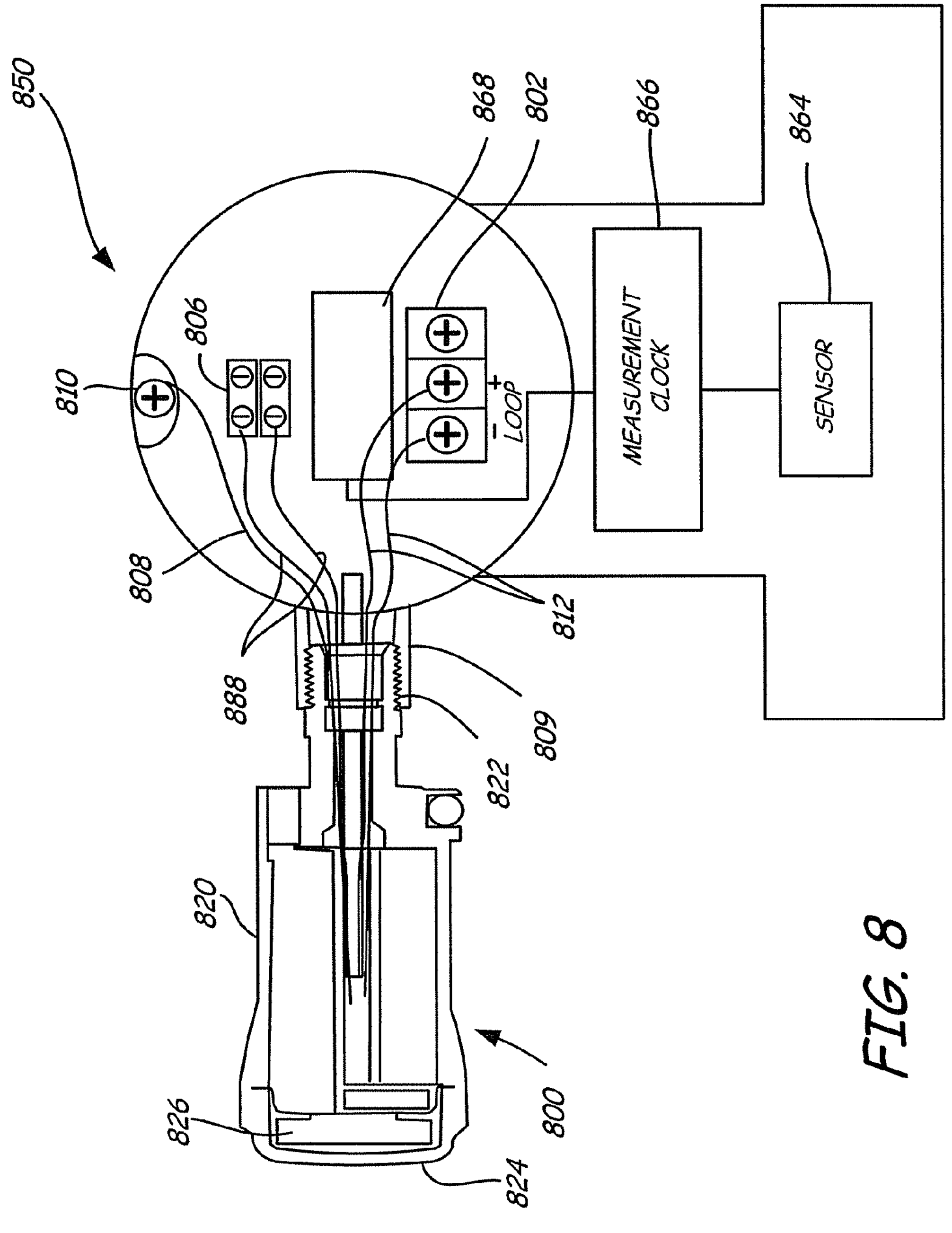
FIG. 8 is a simplified cross-sectional view showing a wireless adapter coupled to a process device.

FIG. 8 is a cross-sectional view of wireless adapter 800 coupled to a process device 850, in accordance with one embodiment of the present invention. Device 850 includes an actuator/transducer 864 and measurement circuitry 866. Measurement circuitry 866 couples to field device circuitry 868. Device 850 couples to two-wire process control loop 888 through a connection block 806 and wireless adapter 800. Further, wireless adapter 800 couples to the housing of device 850. In the example shown in FIG. 8, the coupling is through an NPT conduit connection 809. The chassis of wireless adapter 800 illustratively couples to an electrical ground connection 810 of device 850 through wire 808. Device 850 includes a two-wire process control loop connection block 802 which couples to connections 812 from wireless adapter 800. As illustrated in FIG. 8, wireless adapter 800 can be threadably received in conduit connection 809. Housing 820 carries antenna 826 to support circuitry of wireless adapter 800. Further, an end cap 824 can be sealably coupled to housing 820 and allow transmission of wireless signals therethrough. Note that in the arrangement shown in FIG. 8, five electrical connections are provided to wireless adapter 800 (i.e. four loop connections and an electrical ground connection). These electrical and mechanical connection schemes are however for illustration purposes only. Embodiments of the present invention are not limited to any particular electrical or mechanical connection scheme, and embodiments illustratively include any electrical or mechanical connection scheme.

The term "field device" as used herein can be any device which is used in a process control or monitoring system and does not necessarily require placement in the "field." Field devices include, without limitation, process variable transmitters, digital valve controllers, flowmeters, and flow computers. The device can be located anywhere in the process control system including in a control room or control circuitry. The terminals used to connect to the process control loop refer to any electrical connection and may not comprise physical or discrete terminals. Any appropriate wireless communication circuitry can be used as desired as can any appropriate communication protocol, frequency or communication technique. Power supply components are configured as desired and are not limited to the configurations set forth herein or to any other particular configuration. In some embodiments, the field device includes an address which can be included in any transmissions such that the device can be identified. Similarly, such an address can be used to determine if a received signal is intended for that particular device. However, in other embodiments, no address is utilized and data is simply transmitted from the wireless communication circuitry without any addressing information. In such a configuration, if receipt of data is desired, any received data may not include addressing information. In some embodiments, this may be acceptable. In others, other addressing techniques or identification techniques can be used such as assigning a particular frequency or communication protocol to a particular device, assigning a particular time slot or period to a particular device or other techniques. Any appropriate communication protocol and/or networking technique can be employed including token-based techniques in which a token is handed off between devices to thereby allow transmission or reception for the particular device.

As has been discussed, embodiments of the present invention improve wireless communications with a process device. Certain embodiments reduce electromagnetic interference with wireless adapters by providing a conductive surface that surrounds and protects the enclosed electrical communications modules or components. Antennas of wireless adapters are illustratively placed outside of the conductive surface such that they can communicate wirelessly with a control system. Antennas are optionally environmentally protected by enclosing the antennas with a non-metallic end cap that allows wireless signals to pass through. Additionally, embodiments include improved form factors that enable wireless adapters to be attached to process devices that are in confined environments that may not otherwise permit attachment of a wireless adapter. The form factors are illustratively improved by reducing a width of the wireless adapter and compensating for the width reduction by increasing a length of the adapter.

Although the present invention has been described with reference to particular embodiments, workers skilled in the art will recognize that changes may be made in form and detail without departing from the spirit and scope of the invention.

What is claimed is:

1. A process device wireless adapter comprising:

a wireless communications module configured to communicatively couple to a process device of a type used in an industrial process control or monitoring system, a process control loop to which the process device is coupled, and to a wireless receiver, the wireless communications module being configured to be powered, at least in part, by the process device and also configured to interact with the process device in accordance with a standard industry protocol and to provide wireless communication capabilities to the process device;

a metallic housing that surrounds the wireless communications module, the metallic housing having a first end and a second end, the first end configured to attach to the process device;

an end cap having a metallic shield that contacts the housing second end such that the metallic shield and the housing form a substantially continuous conductive surface and shields the wireless communication module from electromagnetic interference; and an antenna communicatively coupled to the wireless communications module through an aperture in the metallic shield and separated from the wireless communications module by the metallic shield.

2. The process device wireless adapter of claim 1, wherein the wireless communications module comprises a printed circuit board, the printed circuit board having a length and a width, the length extending between the metallic housing first end and the metallic housing second end, and wherein the length is greater than the width.

3. The process device wireless adapter of claim 2, wherein the wireless communications module comprises a second printed circuit board, the second printed circuit board having a length and a width, the length of the second printed circuit board extending between the metallic housing first end and the metallic housing second end, and wherein the second printed circuit board length is greater than the second printed circuit board width.

4. The process device wireless adapter of claim 1, wherein the end cap further includes a plastic radome.

5. The process device wireless adapter of claim 1, wherein the metallic housing comprises aluminum.

6. The process device wireless adapter of claim 1, wherein the metallic housing comprises metalized plastic.

7. The process device wireless adapter of claim 1, wherein the metallic shield comprises stamped metal.

8. The process device wireless adapter of claim 1, wherein the metallic shield comprises plastic plated with a conductive material.

9. The process device wireless adapter of claim 1, wherein the metallic shield contacts the housing second end through spring fingers.

10. The process device wireless adapter of claim 1, wherein the metallic shield contacts the housing second end through a conductive elastomeric gasket.

11. A process device wireless adapter comprising:

a metallic housing having a length and a radius configured to mount to a process device of a type used in an industrial process control or monitoring system;

a printed circuit board within the metallic housing, the printed circuit board having a width and a length, the length of the printed circuit board running along the length of the metallic housing, the length of the printed circuit board being greater than the width of the printed circuit board, the printed circuit board configured to be communicatively coupled to a process device and to provide wireless communication capabilities to the process device;

an end cap having a metallic shield that forms a continuous conductive surface with the metallic housing, the metallic shield having a first side and a second side, the printed circuit board positioned proximate the first side; an antenna electrically connected to the printed circuit board through an aperture in the metallic shield, the antenna positioned proximate the metallic shield second side, the antenna configured to wirelessly transmit communications to a wireless receiver and to wirelessly receive communications from the wireless receiver; and wherein the metallic shield shields the circuit board from electromagnetic radiation.

12. The process device wireless adapter of claim 11, wherein the antenna is a "rubber duck" style whip antenna.

13. The process device wireless adapter of claim 11, wherein potting is included within the metallic housing.

14. The process device wireless adapter of claim 11, further comprising a mechanical attachment region configured to attach to a process device conduit.

15. The process device wireless adapter of claim 14, wherein the mechanical connection region includes a threaded surface.

16. The process device wireless adapter of claim 1, wherein the standard industry protocol is 4-20 mA.

17. The process device wireless adapter of claim 1, wherein the standard industry protocol is HART.

18. The process device wireless adapter of claim 1, wherein the standard industry protocol is Modbus.

19. The process device wireless adapter of claim 1, wherein the standard industry protocol is FOUNDATION Fieldbus.

20. The process device wireless adapter of claim 1, wherein the standard industry protocol is CAN.

21. The process device wireless adapter of claim 1, wherein the standard industry protocol is Profibus—PA.

22. The process device wireless adapter of claim 1, wherein the metallic housing is configured to meet intrinsic safety requirements.

23. The process device wireless adapter of claim 1, wherein the metallic shield is further part of a ground plane of the antenna.

24. The process device wireless adapter of claim 11, wherein the metallic housing is in accordance with intrinsic safety requirements.

25. The process device wireless adapter of claim 11, wherein the metallic shield is further part of a ground plane of the antenna.

* * * * *